United States Patent [19]
Villata

[11] 4,362,229
[45] Dec. 7, 1982

[54] CLUTCH RELEASE BEARING

[75] Inventor: Gino Villata, Buttogliera d'Asti, Italy

[73] Assignee: Valeo, Paris, France

[21] Appl. No.: 173,387

[22] Filed: Jul. 29, 1980

[30] Foreign Application Priority Data

Aug. 16, 1979 [FR] France ................. 79 20772

[51] Int. Cl.³ .......................................... F16D 23/14
[52] U.S. Cl. ..................................................... 192/98
[58] Field of Search ............... 192/110 B, 98, 110 R; 308/236; 403/231, 318; 285/319, 305, 409

[56] References Cited

U.S. PATENT DOCUMENTS

| 198,402 | 12/1877 | Marsden | 285/319 X |
|---|---|---|---|
| 740,664 | 10/1903 | Kroll | 285/409 |
| 3,246,132 | 4/1966 | Jordan et al. | 285/319 X |
| 3,964,833 | 6/1976 | Manriquez | 403/318 |
| 4,144,957 | 3/1979 | Gennes | 192/98 |
| 4,186,828 | 2/1980 | Renaud | 192/98 |

FOREIGN PATENT DOCUMENTS

2151146  4/1973  France .
2195297  3/1974  France .

*Primary Examiner*—George H. Krizmanich
*Attorney, Agent, or Firm*—Charles E. Brown

[57] ABSTRACT

This relates to a clutch release bearing of the kind comprising an operating element, a drive element having a rotatable part for contact with the clutch release mechanism, and a connecting cap fastening the drive element axially to the operating element. The connecting cap is provided with a plurality of axial lugs by which it is attached to the operating element. Each of these lugs is formed with an enlarged and preferably T-shaped end portion and is located in an axial groove provided in the operating element. The T-shaped end of the lug locks the lug in position beyond the groove. The device is particularly applicable to self-centering clutch release bearings.

11 Claims, 12 Drawing Figures

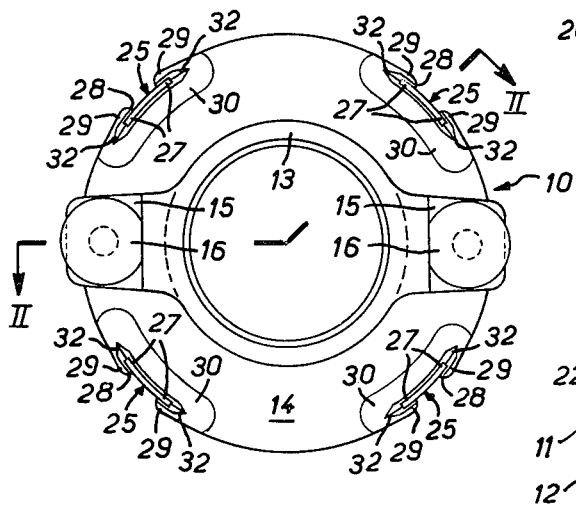
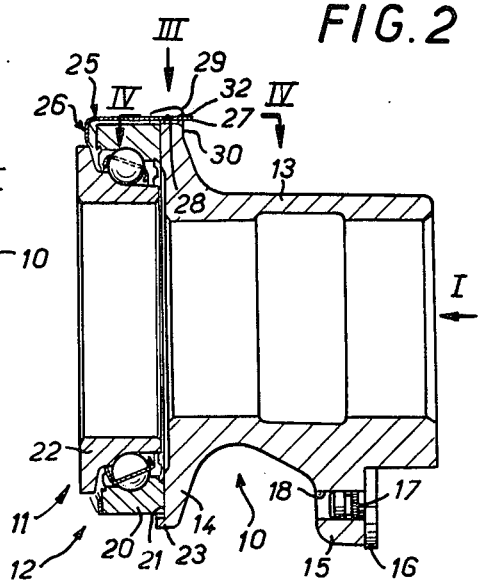
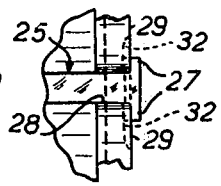
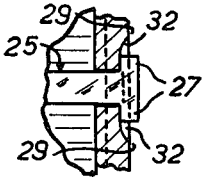
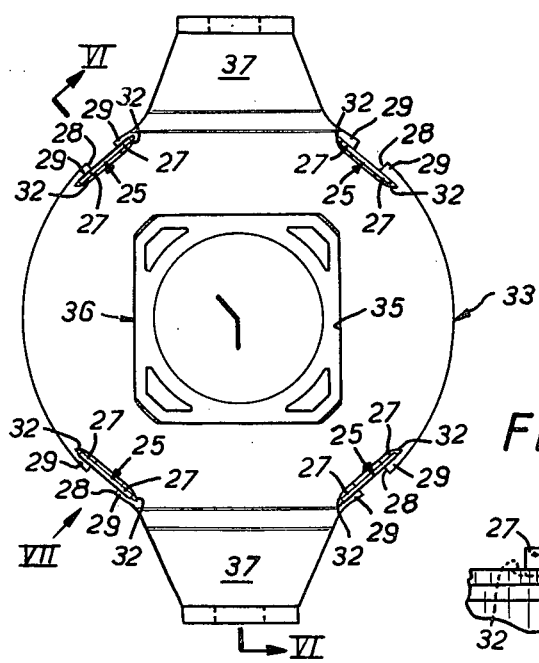
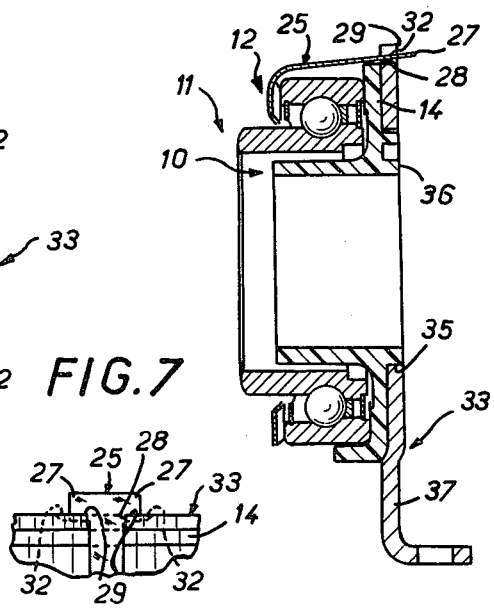
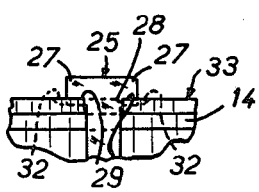

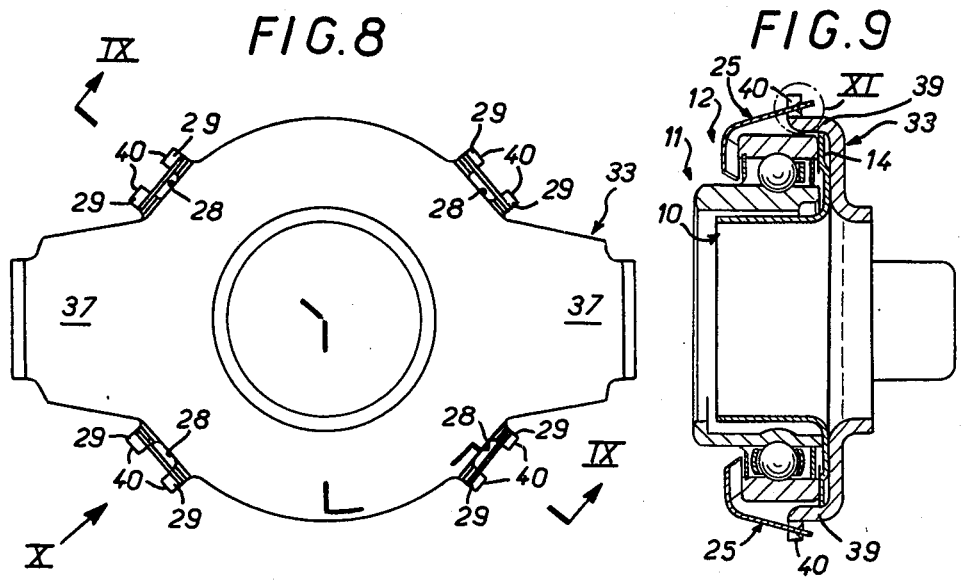
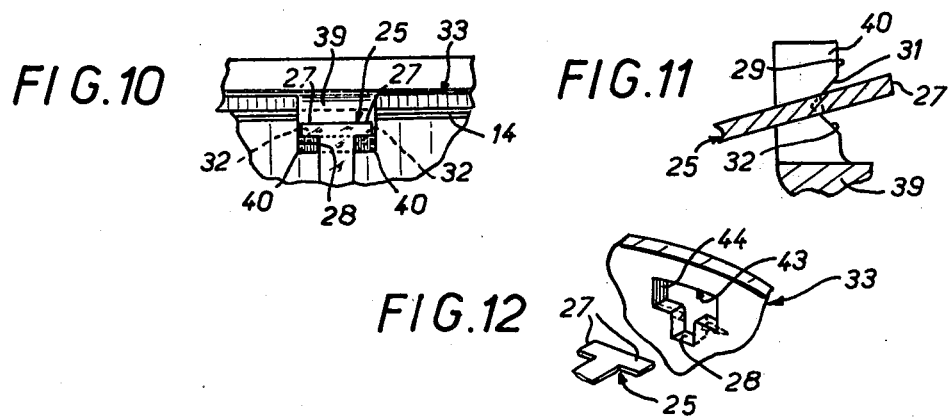

CLUTCH RELEASE BEARING

BACKGROUND OF THE INVENTION

The present invention relates generally to clutch release bearings, that is to say the assembly intended to act on the release device of a clutch, particularly for motor vehicles.

Known clutch release bearings generally comprise an operating element, which is intended to be subjected to the action of a control member such as a clutch release fork, and a drive element, which is intended by the action of the operating element to act upon the release device of the clutch, and which is freely rotatable but axially fixed relative to the operating element.

The present invention concerns more particularly those clutch release bearings in which the axial connection of the drive element to the operating element is provided by means of a connecting cap, this connecting cap comprising for that purpose, a plurality of axial lugs by which it is attached to the operating element, and a front wall which forms an axially-acting resilient means which bears on the drive element and urges the latter against the operating element.

A clutch release bearing of this kind is described in French Pat. No 2,337,281. The construction described in this French Patent concerns a so-called self-centering clutch release bearing, in which the drive element is allowed to universal freedom of movement radially with reference to the operating element, and the operating element is made from plastics material and incorporates an annular flange. The drive element is maintained resiliently in contact with this annular flange, on one side of the latter, by the connecting cap. The control member acts on the other side of this annular flange.

The control member is generally made from metallic material, and in order to prevent this control member from damaging the annular flange of the operating element, which is made of plastics, the annular flange is lined on its surface with a support plate adapted for contact with the control member.

According to the arrangements described in the above-mentioned French patent, this support plate is utilised in order to effect the fastening of the connecting cap; on the circumference of the support plate that are provided engagement spurs projecting at intervals upon which the axial lugs of the connecting cap are engaged, these axial lugs each being formed with an aperture by which it can be engaged on a respective engagement spur.

In practice, for an appropriate radial maintenance of the axial lugs of the connecting cap, i.e. in order to prevent these connecting lugs from escaping radially from the engagement spurs on which they are engaged, with the danger of the drive element becoming detached from the operating element, the engagement spurs are at least slightly curved to provide a hook-shaped configuration.

This arrangement, which has given and continues to give satisfactory performance, is however only acceptable in practice when it is possible to form the hook-shaped curved engagement spurs on the relevant support plate without difficulty, i.e. in so far as this support plate is sufficiently thin to be easily shaped.

This is the case e.g. where the control member acts upon the operating element along a circumference of substantially equal diameter to that of the circumference over which the drive element bears on the operating element, and the support plate associated with the latter has the simple function of a wearing plate; not being subject to any flexing, it can be made of thin sheet metal.

This is not the case where the control member acts upon the operating element along a circumference of much greater diameter than that of the circumference over which the drive element bears on the operating element.

In this case, the support plate associated with the operating element laterally overhangs the latter considerably in order to enable the control member to grip it, and is therefore no longer checked by the operating element in line with such a grip.

In order to prevent any undesirable flexing of the support plate in this case, it is necessary to stiffen it, and therefore in practice to make it thicker.

It is then much more difficult to form the engagement spurs necessary for fastening the connecting cap. The same applies where the operating element is in itself a metallic part and is therefore not lined by a support plate.

The object of the present invention is to provide an arrangement which permits an appropriate fastening of the connecting cap in such cases.

SUMMARY

The present invention provides a clutch release bearing of the kind comprising an operating element intended to be subject to the action of a control member, which in practice is usually a clutch release fork, a drive element intended, by the action of the operating element, to act on the release device of a clutch, and a connecting cap fastening the said drive element axially to the said operating element, said connecting cap comprising a plurality of axial lugs which attach it to the operating element, and a front wall which forms axially-acting resilient means and by which it bears against the drive element and thus urges the latter into contact with the operating element, the clutch release bearing being characterised in that each of the axial lugs of the connecting cap has an enlarged end and thus presents at least one arm laterally, and in that the operating element comprises, for each of the said axial lugs of the connecting cap, an axial groove adapted for the engagement of a lug, and at least one transverse retaining surface arranged on one and/or the other side of this groove and adapted for the abutment of the lateral arm of the said axial lug. The enlarged end is preferably T-shaped.

Thus, instead of engagement spurs, the operating element is formed with grooves for the fastening of the connecting cap, whether these grooves are formed directly in this operating element or whether they are formed in a support plate associated with the latter, together with a T-shaped configuration of the axial lugs of the connecting cap.

Preferably, in order to assist the radial location of these axial lugs, each retaining surface of the operating element contains a groove which extends generally circumferentially, and in which the corresponding lateral arm of an axial lug is engaged by its edge.

Be that as it may, the arrangement according to the invention is appropriate both to the case where the operating element is a moulded part with which no support plate is associated, and to the case where, such a support plate being associated with the operating element or forming an integral part thereof, this support plate has too great a thickness for hook-shaped engagement spurs to be shaped easily on it.

BRIEF DESCRIPTION OF THE DRAWINGS

FIG. 1 is a view in elevation of a clutch release bearing according to the invention, in the direction of the arrow I of FIG. 2;

FIG. 2 is a view in axial section of this clutch release bearing, taken along the broken line II—II of FIG. 1;

FIG. 3 is a partial plan view of the same release bearing, in the direction of the arrow III of FIG. 2;

FIG. 4 is a partial sectional view of the bearing, taken along the line IV—IV of FIG. 2;

FIGS. 5, 6 and 7 are respectively similar views to those of FIGS. 1, 2, 3 and 4, showing another clutch release bearing according to the invention;

FIGS. 8, 9 and 10 are likewise respectively similar views to those of FIGS. 1, 2, 3 and 4, showing another clutch release bearing according to the invention;

FIG. 11 shows on a larger scale a detail of FIG. 9 marked by an inset XI on FIG. 9; and FIG. 12 is a partial view in perspective relating to another embodiment.

DETAILED DESCRIPTION OF THE PREFERRED EMBODIMENTS

As illustrated in these Figures, the clutch release bearing according to the invention comprises generally in known manner, an operating element 10, intended to be subjected to a control member which in practice is usually a clutch release fork (not shown), a drive element 11 intended, by the action of the operating element 10, to act upon the release device of a clutch, (not shown) and a connecting cap 12 fastening the drive element 11 axially to the operating element 10.

In the embodiment illustrated in FIGS. 1 to 4, the operating element 10 is a moulded part, made for example of metal, comprising a sleeve 13, and an annular flange 14 at one end of the sleeve 13.

In its intermediate zone, the sleeve 13 of the operating element 10 is provided laterally with two lobes 15, on each of which is fitted a stud 16 adapted to support the associated control member, each stud 16 having a projecting shank 17 engaged as a force fit in a hole 18 in the corresponding lobe 15.

In the embodiment illustrated, the drive element 11 comprises a ball-bearing, the outer race 20 of which is applied axially against the annular flange 14 of the operating element 10, this annular flange having for that purpose a plane surface 21 perpendicular to the axis of the assembly.

The inner race 22 of the drive element 11 is on the other hand free of all contact with the annular flange 14 of the operating element 10; it constitutes the active part of this drive element 11, i.e. the one intended to act upon the clutch release device.

In the case of a self-centering clutch release bearing, the drive element 11 is free to move within limits radially in all directions with reference to the axis of the assembly, in contact with the annular flange 14 of the operating element 10; in other words, the drive element 11 exhibits universal freedom of movement radially with reference to the operating element 10.

This universal freedom of movement is limited peripherally by a raised edge 23 formed for that purpose on the operating element 10 around the plane surface 21 of its annular flange 14.

As described in the above-mentioned French patent, the connecting cap 12 fastening the drive element 11 axially to the operating element 10 comprises a plurality of axial lugs 25, four in number in the embodiment illustrated, by which it is attached to the operating element 10, and a front wall 26 which constitutes axially acting resilient means, and by which it bears against the drive element 11, thus urging the latter into contact with the operating element 10.

In the example shown, this front wall 26 forms a corrugated washer of the "ONDULFLEX" type.

According to the invention, each of the axial lugs 26 of the connecting cap 12 has its end portion enlarged, and in this case T-shaped, and thus exhibits laterally two arms 27; furthermore, for each of the axial lugs 25 of the connecting cap 12, the operating element 10 comprises, on the one hand, formed radially at the circumference of its annular flange 14, an axial groove 28 adapted to receive an axial lug 25, and on the other hand, on the back of said annular flange 14, two transverse retaining surfaces 29 each arranged respectively on either side of this groove and each respectively adapted for contact with the two lateral arms 27 of the axial lug 25.

In the case of an operating element 10 in the form of a moulded part, the axial grooves 28 may be moulded, and the retaining surfaces 29 associated with each of them may be shaped from a flat 30 resulting from a machining pass, as illustrated.

Preferably, and as illustrated, each of these retaining surfaces 29 of the operating element 10 comprises a groove 32 which extends generally circumferentially, along a circumference common to all these grooves, and in which the corresponding lateral arm 27 of the respective axial lug 25 is engaged by its edge. This groove may result from the local application of a cutting tool against the annular flange 14. Be that as it may, the radial location of the axial lugs 25 of the connecting cap 12, and therefore the fastening of the latter to the operating element 10, are thereby strengthened.

FIGS. 5 to 7 relate to a variant in which the operating element 10 is a part produced by moulding from plastics material, and its annular flange 14 is lined on the surface, on the side opposite the drive element 11, by a support plate 33 adapted for contact with the associated control member.

In the embodiment illustrated, this support plate 33 is engaged, by a central aperture of generally square shape 35, over a protuberance 36 of the same shape on the operating element 10, to lock it against rotation relative to the latter.

This support plate 33, which is provided laterally, in diametrically opposite positions, with two arms 37 adapted for contact with the control member, is utilised for the fastening of the connecting cap 12.

For this purpose, its periphery extends radially beyond that of the annular flange 14 of the operating member 10, and on its edge the axial grooves 28 adapted for the engagement of the axial lugs 25 are cut out radially.

Furthermore, as previously, the retaining surfaces 29 framing each of these axial grooves 28 each comprise a circumferential groove 32 for engaging the edge of the corresponding lateral arm of the relevant axial lug 25 of the connecting cap 12.

According to the variant illustrated in FIGS. 8 to 11, the operating element 10 is constructed from sheet metal. The support plate 33 which is associated with it comprises at its external circumference axial lugs 39 extending in the direction of the drive element 11. Each of the grooves 28 formed in the support plate 33 for the engagement of an axial lug 25 of the connecting cap 12 is formed between two spurs 40 projecting radially at the end of the respective axial lug 39, along the free edge of the latter.

As previously, each of the retaining surfaces 29 associated with the axial groove 28, which surfaces in this case are formed on the back of the corresponding spur 40, contains a circumferential groove 32 for the engagement, by its edge, of the corresponding lateral arm 27 of the respective axial lug 25.

According to the embodiment illustrated in FIG. 12, in which only the support plate 33 and an axial lug 25 of the connecting cap 12 have been partially shown, the axial groove 28 formed in the support plate 33 belongs to a T-shaped port 43 cut out of the support plate 33.

The region 44 of greatest width of port 43 permits the passage of the lateral arms 27 of the respective axial lug 25, and it is then only necessary to turn the latter down radially to engage the axial groove 28. As previously, the retaining surfaces on either side of the latter each contain a circumferential groove 32.

It is self-evident that, in the foregoing, the support plate 33 is to be considered as incorporated in the operating element 10, and therefore forming a part of the latter.

The present invention is not limited to the embodiments described and illustrated, but includes all variants and/or combination of their various elements within the scope of the appended claims.

Particularly, the widened end of a lug 25 could, as a variant, have only one arm, e.g. it could be L-shaped.

I claim:

1. A clutch release bearing of the kind comprising an operating element intended to be subjected to the action of a control member, a drive element adapted to act on the release device of a clutch by the action of the operating element, and a connecting cap fastening said drive element axially to said operating element, said connecting cap comprising a plurality of axial lugs by which it is attached to the operating element, and a front wall which forms axially-acting resilient means, and through which it bears against the drive element to urge said drive element into contact with the operating element, characterised in that each of the axial lugs of the connecting cap has an enlarged free end which comprises laterally at least one arm, and the operating element is formed, for each of the said axial lugs, with an axial groove adapted to receive one of said lugs, at least one transverse retaining surface being provided on one side of this groove adapted for abutment with said lateral arm of the respective axial lug.

2. A clutch release bearing comprising an operating element cooperable with a control member, a drive element cooperable with a clutch release means, and a one-piece connecting clip securing said drive element for axial movement with said operating member to operate said clutch release means, said connecting clip comprising an endwall defining axially acting resilient means and a plurality of axial lugs joined to and axially extending from said endwall and attached to said operating element, said endwall bearing against said drive element to urge said drive element into contact with said operating element, each of said axial lugs having a circumferentially enlarged free end forming at least one lateral arm, an axial groove in said operating element for receiving each of said axial lugs, at least one transverse retaining surface circumferentially extending from at least one side of each of said axial grooves for abutment with said lateral arms of said axial lugs.

3. A clutch release bearing comprising an operating element cooperable with a control member, a drive element cooperable with a clutch release means, and a connecting clip securing said drive element for axial movement with said operating member to operate said clutch release means, said connecting clip comprising an endwall defining axially acting resilient means and a plurality of axialy lugs joined to and axially extending from said endwall and attached to said operating elements, said endwall bearing against said drive element to urge said drive element into contact with said operating element, each of said axial lugs having a circumferentially enlarged free end forming at least one lateral arm, an axial groove in said operating element for receiving each of said axial lugs, at least one transverse retaining surface extending from at least one side of each of said axial grooves for abutment with said lateral arms of said axial lugs, said transverse retaining surface defining generally circumferentially extending grooves for circumferentially extending, axially inner edges of said lateral arms received in said circumferentially extending grooves.

4. A clutch release bearing according to claim 2 or 3, wherein each of said enlarged free ends is T-shaped and comprises two lateral arms extending in circumferentially opposite directions.

5. A clutch release bearing according to claim 4, wherein each transverse retaining surface of said operating element contains a groove which extends generally circumferentially and in which the edge of the corresponding lateral arm of the respective axial lug is engaged.

6. A clutch release bearing according to claim 2 or 3, wherein said axial groove in said operating element is radially open at the periphery thereof.

7. A clutch release bearing according to claim 2 or 3, wherein said axial groove in said operating element is formed between two radial projections at the periphery thereof.

8. A clutch release bearing according to claim 2 or 3, wherein said axial groove in said operating element forms part of a T-shaped cutout therein.

9. A clutch release bearing according to claim 2 or 3, wherein said axial lugs extend both axially and outwardly from said endwall.

10. A clutch release bearing according to claim 3, wherein said grooves form recesses having an axial depth.

11. A clutch release bearing according to claim 1, wherein each transverse retaining surface of said operating element contains a groove which extends generally circumferentially and in which the edge of the corresponding lateral arm of the respective axial lug is engaged.

* * * * *